UNITED STATES PATENT OFFICE.

KARL SCHIRMACHER AND RICHARD LEOPOLD, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

DARK-GREEN-BLACK DYE.

No. 881,157.　　　Specification of Letters Patent.　　Patented March 10, 1908.

Application filed February 20, 1907. Serial No. 358,419.

*To all whom it may concern:*

Be it known that we, KARL SCHIRMACHER, Ph. D., and RICHARD LEOPOLD, Ph. D., chemists, citizens of the Empire of Germany, and residing at Höchst-on-the-Main, Germany, have invented certain new and useful Improvements in Dark-Green-Black Dyes, of which the following is a specification.

This invention relates to new vat dyestuffs, the constitution of which corresponds to the formula

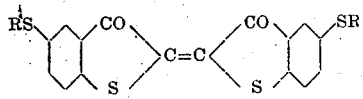

wherein "R" means ethyl and methyl.

The new dyestuffs may be obtained by oxidizing 5-alkylthio-oxythionaphthene carboxylic acids (RS:S:C = 5:2:1) obtained from 5-alkylthiophenylthioglycollic-ortho-carboxylic acids (RS:SCH$_2$COOH:COOH = 5:2:1) by heating with alkali. They are black powders, insoluble in water, soluble in hot alcohol, benzene, glacial acetic acid and chloroform with a violet color, in concentrated sulfuric acid with a blue-green color. With alkaline hydrosulfite they yield yellow colored vats dyeing wool and cotton black-green shades.

The process may be carried out for instance, as follows:

Example: 19.8 parts of 5-acetamino-2-aminobenzoic acid are diazotized with 20 parts of hydrochloric acid of 20° Bé. specific gravity and 7 parts of nitrite and run into a solution of 20-25° C. of 18 parts of potassium xanthogenate to which are added 40 parts of sodium carbonate. On the evolution of nitrogen having ceased, 30 parts of caustic soda-lye of 40° Bé. specific gravity and a solution of 15 parts of sodium chloracetate are added and the whole is heated to 100° C. for about 3 hours. From the cold solution the 5-acetaminophenylthioglycollic-ortho-carboxylic acid is precipitated by adding mineral acids. It is a feebly colored crystalline powder soluble in hot water and crystallizing therefrom when cold.

Hydrolysis is effected by dissolving 26 parts of 5-acetaminophenylthioglycollic-ortho-carboxylic acid with 40 parts of caustic soda-lye of 40° Bé. specific gravity under addition of the double volume of water and by heating to boil, till a test portion of the solution with hydrochloric acid no longer gives any precipitate of the unchanged acetyl compound. After acidifying 20 parts of hydrochloric acid of 20° Bé. specific gravity are added in the cold and diazotized by adding 6.9 parts of nitrite. The diazo solution thus obtained is run at 20-25° C. into a solution of 50 parts of sodium carbonate and 18 parts of potassium xanthogenate. When the evolution of the nitrogen has ceased the 5-xanthogenate derivative of the phenylthioglycollic-ortho-carboxylic acid of the formula $(C_2H_5OCS_2)C_6H_3(SCH_2COOH)COOH)$ is precipitated by adding a mineral acid. The product of reaction separating in form of a soft mass soon solidifies. To transform it into the 5-methylthiophenyl-thioglycollic-ortho-carboxylic acid it is dissolved with 45 parts of caustic soda-lye of 40° Bé. specific gravity and 25 parts of sodium methylsulfate in 250 parts of water and boiled for 2-3 hours under reflux. When cold it is filtered and the 5-methylthiophenylthioglycollic-ortho-carboxylic acid is precipitated as a yellowish body by adding mineral acids; recrystallized from water it is a crystalline powder decomposing and melting at 180-188.

To transform into the corresponding 5-methylthio-oxythionaphthene carboxylic acid 26 parts of 5-methylthiophenylthioglycollic-ortho-carboxylic acid are introduced into a mixture of 150 parts of caustic soda and 15 parts of water. The whole is heated to 180-190° C. and this temperature is kept for some time. The mass becomes gradually solid and brittle. When cold it is dissolved in water. On addition of mineral acids the 5-methylthio-oxythionaphthene carboxylic acid is precipitated in form of white flakes. If boiled with hydrochloric acid there is obtained the corresponding 5-methylthio-oxythionaphthene while eliminating carbonic acid. This methylthio-oxythionaphthene carboxylic acid or the aforementioned methylthio-oxythionaphthene are characterized by a yellow nitroso derivative which is resulting from them by the action of nitrous acid. The methylthio-oxythionaphthene has the melting point 81–82°.

To obtain the dyestuff 24 parts by weight of 5-methylthio-oxythionaphthene carboxylic acid are dissolved with 15 parts by weight of caustic soda-lye of 40° Bé. specific gravity in 1000 parts by weight of water, adding a solution of potassium ferri cyanid at gentle heat, till no further dyestuff is formed. The dyestuff separates in green-black flakes and may be isolated by filtering and washing with water. It has the properties mentioned above.

In an analogous manner 5-ethylthio-oxythionaphthene carboxylic acid and a dyestuff therefrom is obtained, being very similar to that afore described.

Having now described our invention, what we claim is:

As products the vat dyestuffs of the constitution of which corresponds to the formula:

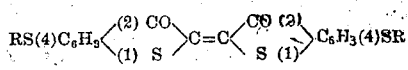

wherein "R" means ethyl and methy being dark green black powders, insoluble in water and soluble in alcohol, glacial acetic acid, benzene and chloroform with a violet color, in concentrated sulfuric acid with a blue green color; with alkaline hydrosulfite they yield yellow colored vats dyeing wool and cotton black-green shades.

In testimony, that we claim the foregoing as our invention, we have signed our names in presence of two subscribing witnesses.

KARL SCHIRMACHER.
RICHARD LEOPOLD.

Witnesses:
JEAN GRUND,
CARL GRUND.